United States Patent [19]
Nakata et al.

[11] Patent Number: 5,509,121
[45] Date of Patent: Apr. 16, 1996

[54] MULTI-PROTOCOL COMMUNICATION CONTROL APPARATUS

[75] Inventors: Yukio Nakata, Machida; Hidemitsu Higuchi, Yokohama; Yukio Shimamoto, Chigasaki; Atsushi Kobayashi, Hadano, all of Japan

[73] Assignee: Hitachi, Ltd., Tokyo, Japan

[21] Appl. No.: 428,453

[22] Filed: Apr. 25, 1995

Related U.S. Application Data

[63] Continuation of Ser. No. 939,591, Sep. 2, 1992, abandoned.

[30] Foreign Application Priority Data

Sep. 2, 1991 [JP] Japan ................................ 3-221875

[51] Int. Cl.$^6$ ................................ G06F 13/00
[52] U.S. Cl. ................ 395/200.1; 364/DIG. 1; 364/DIG. 2; 364/240.8; 364/242.94
[58] Field of Search ............. 364/DIG. 1 MS File, 364/DIG. 2 MS File; 395/200.1, 500, 800; 379/91, 289

[56] References Cited

U.S. PATENT DOCUMENTS

| | | | |
|---|---|---|---|
| 4,807,282 | 2/1989 | Kazan et al. | 379/284 |
| 4,972,463 | 11/1990 | Danielson et al. | 379/91 |
| 5,021,949 | 6/1991 | Morten et al. | 395/200 |
| 5,063,494 | 11/1991 | Davidowski et al. | 395/800 |
| 5,182,751 | 1/1993 | Bales et al. | 370/110.1 |

FOREIGN PATENT DOCUMENTS 1-126044  5/1989  Japan.

Primary Examiner—Robert B. Harrell
Attorney, Agent, or Firm—Antonelli, Terry, Stout & Kraus

[57] ABSTRACT

A multi-protocol communication control apparatus which includes a plurality of kinds of upper layer protocol controllers, a plurality of kinds of lower layer protocol controllers, and a common interface controller for processing correspondence between the upper and lower layer protocols controllers. The multi-protocol communication control apparatus provides for the optional use of any combination of a plurality of kinds of upper layer communication protocols, a plurality of kinds of lower layer communication protocols, and a plurality of transmission lines.

7 Claims, 13 Drawing Sheets

FIG. 2(a)

| OPEN | DATALINK TYPE (L1) | ENTRY ADDRESS (E1) |

FIG. 2(b)

| SEND | DATALINK TYPE (L1) | DATA LENGTH | DATA AREA ADDRESS |

FIG. 2(c)

| RECV | DATALINK TYPE (L1) | DATA LENGTH | DATA AREA ADDRESS |

FIG. 2(d)

| OPEN | KINDS OF UPPER LAYER PROTOCOL (P1) | ENTRY ADDRESS (E1) |

FIG. 3

| 6 | 6 | 2 | 1 | 1 | 1-2 | BYTE |
|---|---|---|---|---|-----|------|
| DA | SA | L | DSAP | SSAP | C | DATA |

C; X'C0', X'C8', X'F5', X'FD', X'C7', X'CF' ) TYPE 1
C; OTHER THAN THE ABOVE —— TYPE 2

MULTI-PROTOCOL COMMUNICATION CONTROL APPARATUS

This application is a continuation of application Ser. No. 07/939,591, filed on Sep. 2, 1992, now abandoned.

BACKGROUND OF THE INVENTION

The present invention relates to a communication protocol control apparatus of a data communication apparatus. In a multi-protocol communication control apparatus for selecting an optional communication protocol from a plurality of communication protocols and communicating data between work stations, a conventional apparatus, as described in Japanese Patent Laid-Open No. 1-126044, has means for extracting specific information from header contents of received data and judging whether the extracted information matches the assumed kind of upper layer protocol so as to transfer the received data to the corresponding communication protocol.

The above prior art can use only one kind of transmission line and only one kind of data link control type for the above transmission line. Therefore, a situation where a plurality of data link controllers having lower layer communication protocols is not taken into account even if a plurality of upper layer communication protocols are installed.

SUMMARY OF THE INVENTION

The object of the present invention is to provide a multi-protocol communication control apparatus for realizing communication using an optional combination of a plurality of kinds of upper layer communication protocols, a plurality of kinds of lower layer communication protocols, and a plurality of transmission lines.

Communication is controlled by a multi-protocol communication control apparatus having a plurality of kinds of upper layer protocol controllers, a plurality of kinds of lower layer protocol controllers, and a common interface controller for processing the correspondence between the two which is installed between the two. Each of the above upper layer protocol controllers has apparatus for specifying the kind of lower layer protocol for using for the common interface controller and the common interface controller has a storage for storing the correspondence between the kind of upper layer protocol and the kind of lower layer protocol for the specification from an upper layer protocol controller. Therefore, the common interface controller can send transmission data from an upper layer protocol controller to the corresponding lower layer protocol controller and received data from a lower layer protocol controller to the corresponding upper layer protocol controller.

The storage of the common interface controller can store the correspondence between the upper layer protocols and lower layer protocols beforehand.

Each of the above lower layer protocol controllers can have an identification apparatus for identifying the kind of lower layer protocol.

Furthermore, the common interface controller can have a apparatus for specifying specifying the kind of upper layer protocol for the common interface controller of another multi-protocol communication control apparatus.

The plurality of kinds of upper layer protocol controllers, the common interface controller, and the plurality of kinds of lower layer protocol controllers mentioned above are modularized and constructed respectively. Each of the above controllers can have a module connection processor for storing module connection information indicating the top address of the control processing program thereof and can have a common module connection manager for receiving and storing the module connection information from the module connection processor of each controller so as to connect the controllers.

Furthermore, the upper layer protocol controllers and the lower layer protocol controllers can have buffers for storing data respectively and the common interface controller can have a buffer manager for transferring data between the buffers of the upper layer protocol controllers and the buffers of the lower layer protocol controllers.

It is possible to construct a multi-protocol network system which has at least two multi-protocol communication control apparatuses including a plurality of kinds of upper layer protocol controllers, a plurality of kinds of lower layer protocol controllers, and a common interface controller for processing the correspondence between the two which is installed between the two, wherein each of the multi-protocol communication control apparatuses has specifying apparatus for specifying the kind of upper layer protocol controller for using for the other multi-protocol communication control apparatus for communicating.

Furthermore, it is possible to construct a multi-protocol network system with a plurality of communication control apparatuses which has at least one multi-protocol communication control apparatus having a plurality of kinds of upper layer protocol controllers, a plurality of kinds of lower layer protocol controllers, and a common interface controller for processing the correspondence between the two which is installed between the two.

When a plurality of different upper layer protocols select a plurality of different data link control types for communication, it is possible to install a common interface controller between the upper layer protocol controllers and the data link controllers, to specify one of a plurality of data link control types when an upper layer protocol controller issues a connection request to the common interface controller, and to combine an optional upper layer protocol to an optional data link control type because the common interface controller stores the correspondence between the upper layer protocol controllers and data link control types, and furthermore to operate them simultaneously.

BRIEF DESCRIPTION OF THE DRAWINGS

FIGS. 2(a) 2(b) 2(c) and 2(d) are drawings showing the format of data which is transferred between an upper layer protocol controller, common inter face controller, and driver;

FIG. 3 is a drawing showing the packet format for indicating a method for identifying a type 1 packet and type 2 packet;

DETAILED DESCRIPTION OF PREFERRED EMBODIMENTS

Figure 1:
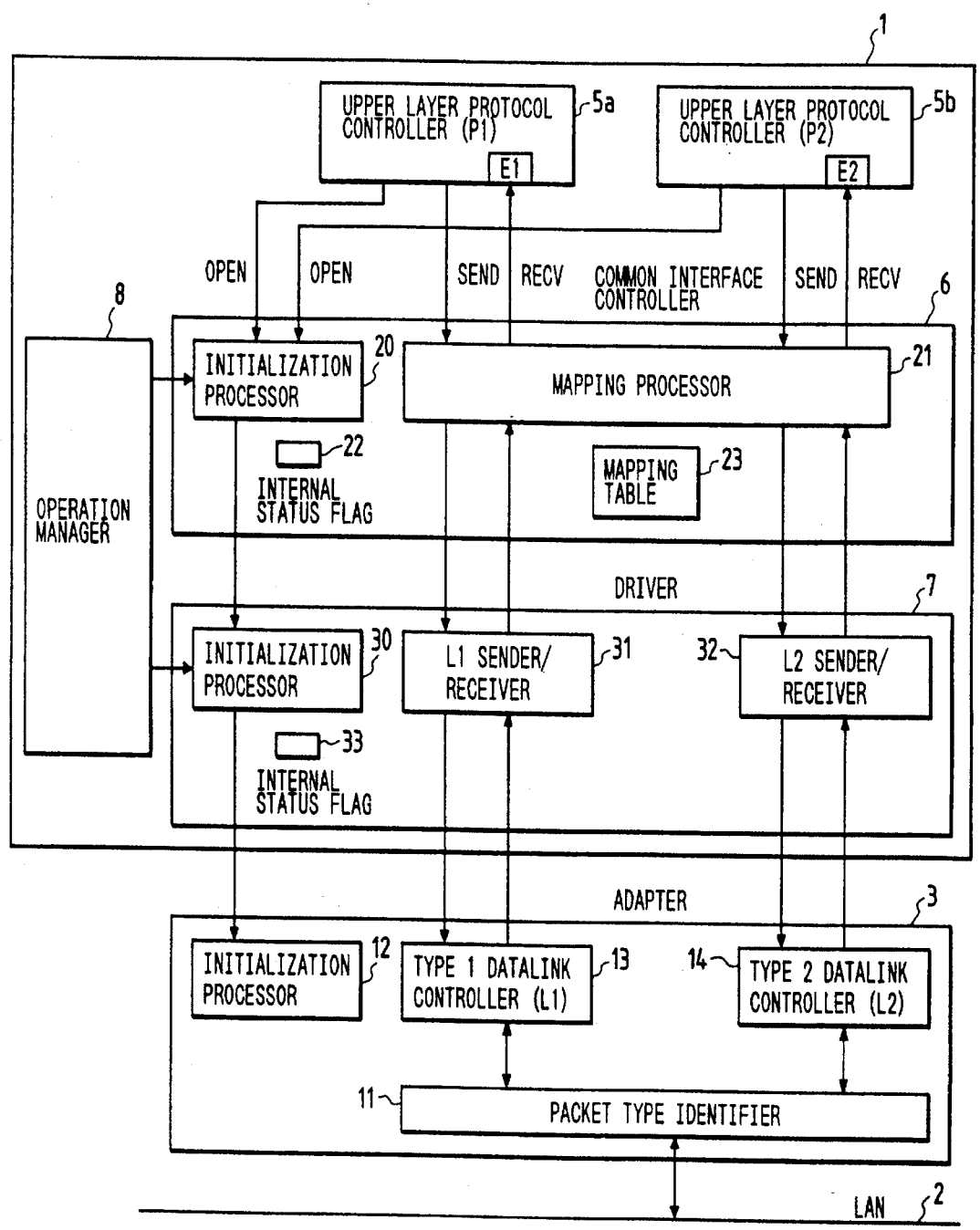
FIG. 1 is a block diagram showing the structure of a multi-protocol communication control apparatus according to the present invention.

The first embodiment of the present invention will be explained with reference to FIG. 1. FIG. 1 is a block diagram showing the structure of an embodiment of the present invention.

In FIG. 1, numeral 1 denotes the main unit of a multi-protocol communication control apparatus and 3 an adapter for data link control. Numeral 2 denotes a transmission medium constituting a LAN which is connected to the adapter 3. A plurality of transmission media can be connected to the adapter 3. An example of LAN is an LEEE802.3 standard CSMA/CD (carrier sense multiple access with collision detection). The adapter 3 comprises a packet type identifier 11 for identifying the packet type, an initialization processor 12 for initializing the adapter 3, and a type 1 data link controller (L1) 13 and a type 2 data link controller (L2) 14 which are lower layer protocol controllers. The types of data ink controllers are "connectionless" and "connection oriented". An example of the connectionless type is type 1 of IEEE802.2 standard LLC (logical link control) and an example of the connection oriented type is type 2 of IEEE802.2 standard LLC. The adapter 3 may contain more than one data link controller.

Numerals 5a and 5b denote upper layer protocol controllers. In this embodiment, two upper layer protocol controllers are shown, though more than two upper layer protocol controllers can be used. Examples of upper layer protocol control are control of upper five layers (application, presentation, session, transport, and network) of an OSI protocol and control of a TCP/IP (transport control protocol/internet protocol). Upper layer protocols and lower layer protocols Can be optionally combined.

Numeral 6 denotes a common interface controller which comprises an initialization processor 20 for initializing a driver 7, a mapping processor 21 for processing the correspondence between the upper layer protocol controllers and data link controllers, a status flag 22 for setting "Initialized" of the driver 7, and a mapping table 23 for storing the correspondence between the upper layer protocol controllers and data link controllers.

The driver 7 controls the adapter 3 and comprises an initialization processor 30 for initializing the adapter 3, an L1 sender/receiver 31, an L2 sender/receiver 32, and a status flag 33 for setting "Initialized" of the adapter 3.

Numeral 8 denotes an operation manager for initializing the common interface controller 6 and the driver 7.

Figure 17:
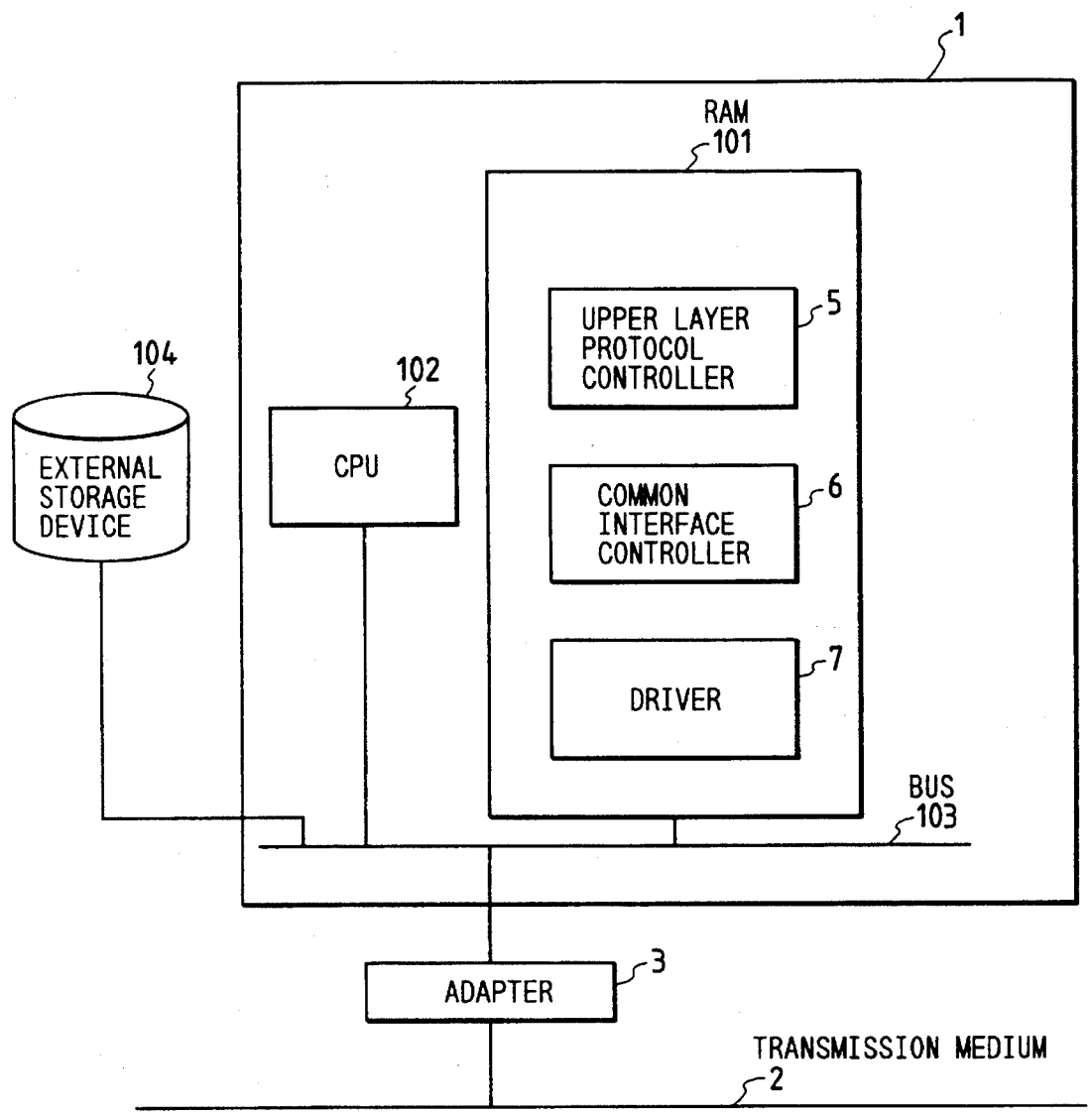
FIG. 17 is a drawing showing the hardware structure of a multi-protocol communication control apparatus according to the present invention.

A hardware block diagram of an embodiment of the present invention is shown in FIG. 17.

The controllers and operation manager shown in the block diagram in FIG. 1 are stored in a RAM 101 as a program as shown in FIG. 17 and processed by a CPU 102. The embodiment has an adapter 3 and an external storage device 104 and the RAM 101, CPU 102, adapter 3, and external storage device 104 are connected to a common bus 103. The adapter 3 is connected to a transmission medium 2.

Figure 13:
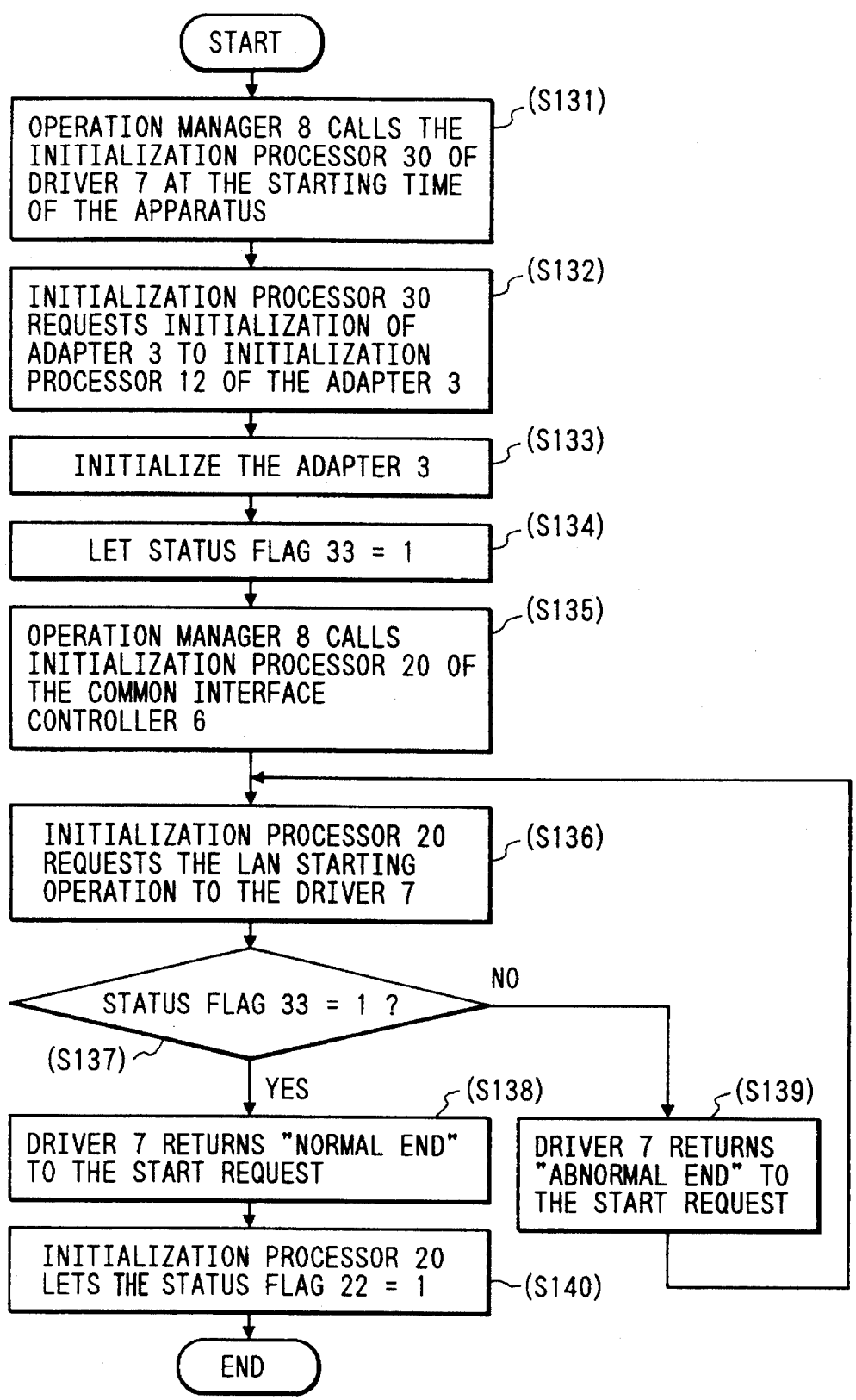
FIG. 13 is a flow chart of the initialization processing of the block diagram according to the present invention which is shown in FIG. 1.

Next, the initialization processing operation of the block diagram shown in FIG. 1 will be explained with reference to the initialization processing flow chart shown in FIG. 13.

At the starting time of the apparatus, the operation manager 8 calls the initialization processor 30 of the driver 7 (S131). Next, the initialization processor 30 requests initialization of the adapter 3 to the initialization processor 12 of the adapter 3 (S132). The initialization processor 12 initializes the adapter 3 (S133). When the initialization ends normally, the initialization processor 30 sets the status flag 33 of the driver 7 to "Adapter 3 Initialized" (status flag 33=1) (S134).

Next, the operation manager 8 calls the initialization processor 20 of the common interface controller 6 (S135). Next, the initialization processor 20 requests starting (OPEN) of the LAN to the driver 7 (S136). The driver 7 checks the status flag 33 (S137). When the adapter 3 is already initialized, the driver 7 returns "normal end" to the Open request (S138). When the adapter 3 is not initialized, the driver 7 returns "abnormal end" to the Open request (S139). When the Open request ends abnormally, the initialization processor 20 reissues the Open request. When the Open request ends normally, the initialization processor 20 sets the status flag 22 of the common interface controller 6 to "Initialized" (status flag 22 =1) on the assumption that the LAN is opened (S140).

Figure 14:
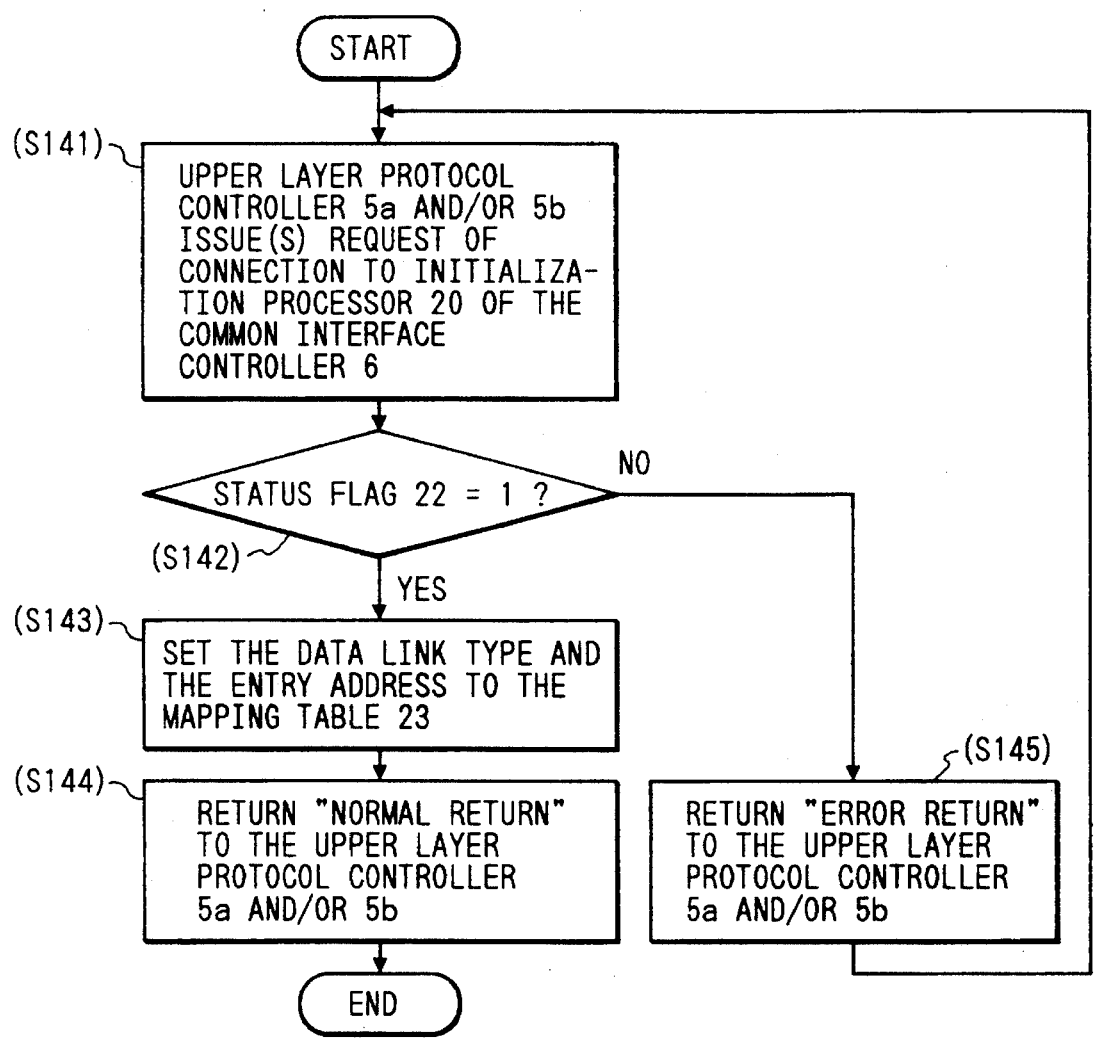
FIG. 14 is a flow chart of the mapping processing for explaining the processing for correlating an upper layer protocol controller with a driver.

Next, the processing for issuing a connection request so as to communicate and correlating the upper layer protocol controller 5 with the driver 7 will be explained with reference to the mapping processing flow chart shown in FIG. 14.

The upper layer protocol controller 5a issues a connection request to the initialization processor 20 of the common interface controller 6 (S141). The connection request is issued by processing of the application program of the upper layer protocol controller. The format of connection request data at this time will be explained with reference to FIG. 2.

FIGS. 2(a)–(d) show the format of data which is transferred between the upper layer protocol controller, common interface controller, and driver. FIG. 2 (a) shows the format of a connection request from the upper layer protocol controller 5a. As shown in FIG. 2(a), the data contains the connection request as well as information of the data link type and entry address as parameters.

When the common interface controller 6 receives the connection request, it checks the status flag 22 first (S142). When the adapter 3 is already initialized, the initialization processor 20 sets the data link type and entry address in the free column of the mapping table 23 (S143). In this example, the initialization processor 20 sets a data link type L1 and an entry address E1. After setting, the initialization processor 20 returns "normal return" to the upper layer protocol controller 5a (S144). When the status flag is not initialized, the initialization processor 20 returns "error return" to the connection request (S145). In this case, the upper layer protocol controller reissues the connection request.

Figures 4, 5A, 5B:
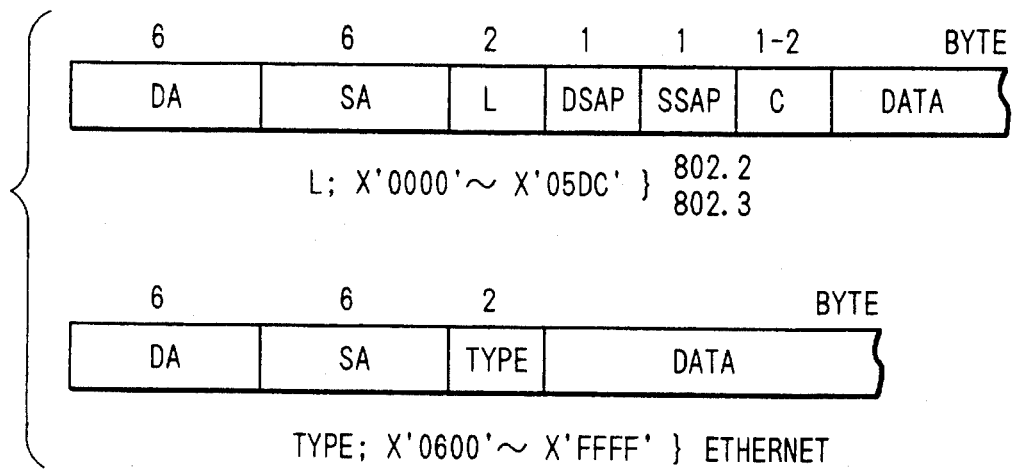
FIG. 4 is a drawing showing the packet format for indicating a method for identifying an Ethernet (the registered trademark of Xerox Corp.) packet and CSMA/CD packet.
FIGS. 5(a) and (b) are drawings showing the structure of a mapping table.

Furthermore, the upper layer protocol controller 5b also issues a connection request to the common interface controller. In this example, the initialization processor 20 specifies a data link type L2 and an entry address E2 as parameters. As a result, the data link type L2 and the entry address E2 are set in the mapping table 23. FIG. 5(a) shows the contents of the mapping table wherein the above contents are set. As mentioned above, the data link type L1, the entry address E1, the data link type L2, and the entry address E2 are set.

The mapping table 23 of the common interface controller 6 is set as mentioned above and data is transmitted or received according to this setting hereafter.

Figure 15:
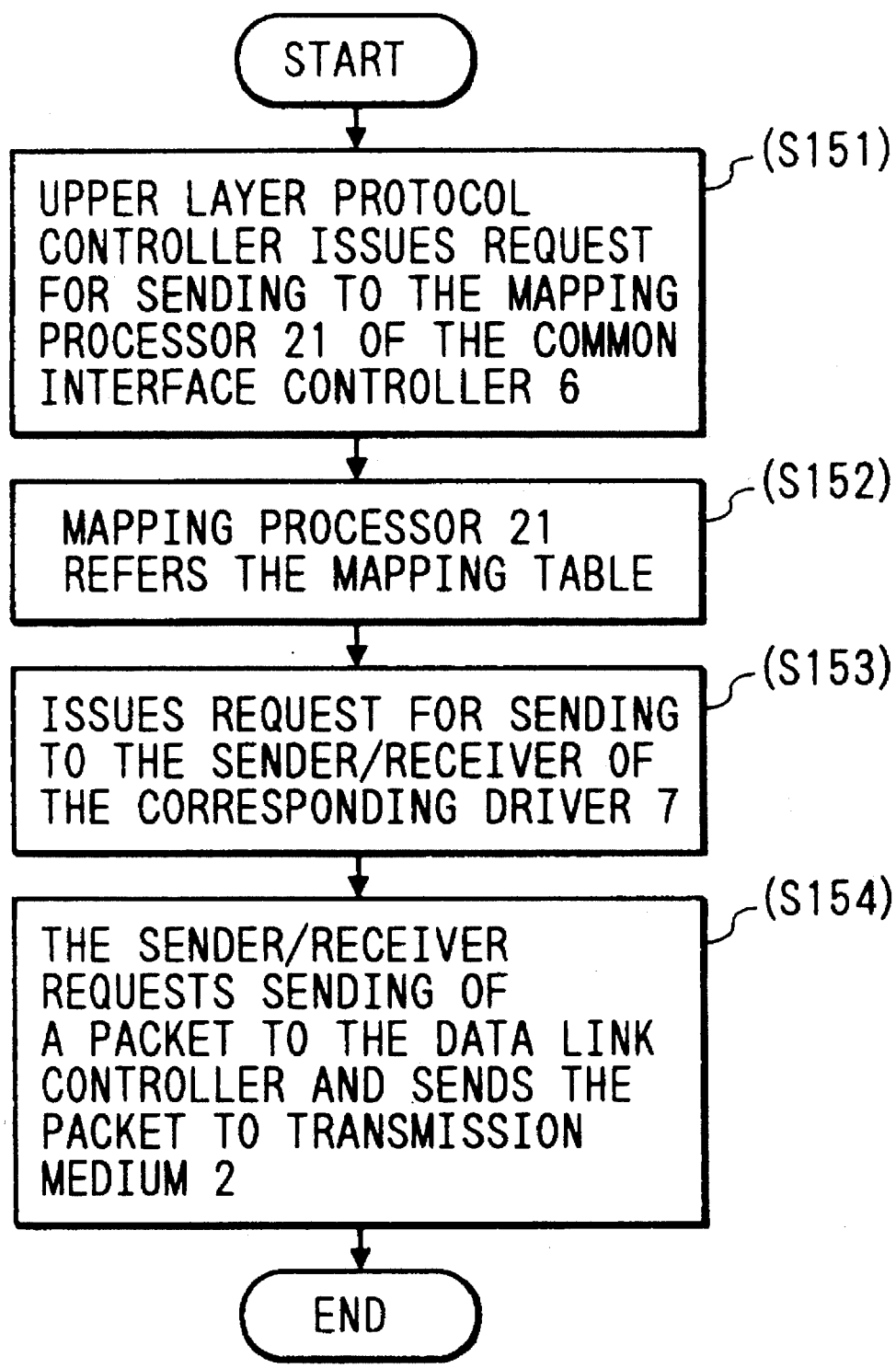
FIG. 15 is a flow chart of data transmission.

Next, the data transmission operation will be explained with reference to the data transmission flow chart shown in FIG. 15.

The upper layer protocol controller 5a issues a request for sending (Send) to the mapping processor 21 of the common interface controller 6 (S151). FIG. 2(b) shows the format of the Send request. In FIG. 2(b), the Send request contains information of the data link type, data length, and data storage address as parameters. In this example, the data link type is L1.

The mapping processor 21 issues the Send request to the L1 sender/receiver 31 of the driver 7 according to the data link type L1 as a parameter. The L1 sender/receiver 31 requests sending of a packet to the type 1 data link controller 13 of the adapter 3 and sends the packet to the transmission medium 2.

The upper layer protocol controller 5b also performs the operation mentioned above, except that the Send request is issued to the L2 sender/receiver and the packet is sent.

Figure 16:
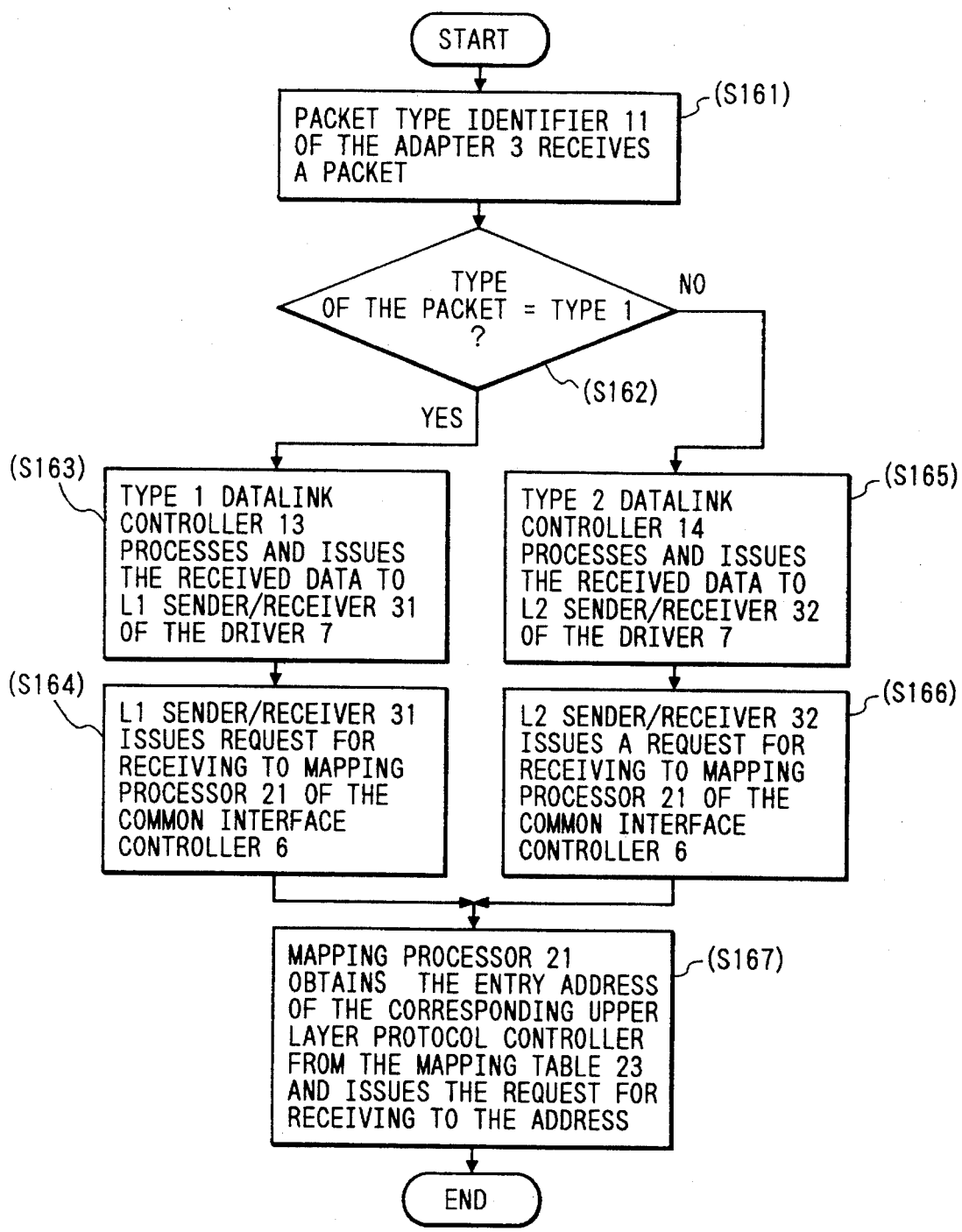
FIG. 16 is a flow chart of data reception.

Next, the data reception operation will be explained with reference to the data reception flow chart shown in FIG. 16. The packet type identifier 11 of the adapter 3 receives a packet from the transmission medium 2 (S161) and decides the packet type (S162). When the type is type 1, the type 1 data link controller 13 processes and issues the received data to the L1 sender/receiver 31 of the driver 7 (S163). The L1 sender/receiver 31 issues a Recv request wherein the data link type L1, data length, and data storage address are set as parameters to the mapping processor 21 of the common interface controller 6 (S164). The format of the reception request (Recv) is shown in FIG. 2(c). The Recv request contains, as shown in FIG. 2(c), the reception request as well as information of the data link type, data length, and data storage address as parameters. In this example, the data link type is L1.

The mapping processor 21 obtains the entry address E1 of the corresponding upper layer protocol controller from the mapping table 23 using the data link type L1 which is a parameter of the Recv request and issues the Recv request to the address (S167).

When a packet addressed to the type 2 data link control is received, the type 2 data link controller 14 of the adapter 3 issues the received data to the L2 sender/receiver 32 of the driver 7 (S165) and the L2 sender/receiver 32 issues the Recv request wherein L2 is set as a parameter to the mapping processor 21 of the common interface controller 6 (S166). The mapping processor 21 obtains the entry address E2 of the corresponding upper layer protocol controller from the mapping table 23 in the same way as above and issues the Recv request to the address of the upper layer protocol controller 5b (S167).

Next, a method for identifying the data link type of the received packet by the packet type identifier 11 of the adapter 3 will be explained.

FIG. 3 shows the format of an IEEE802.3 standard CSMA/CD packet and an IEEE802.2 standard LLC packet. In FIG. 3, type 1 or type 2 can be identified by the value of the C field of the LLC header. When the value of the C field is one of X'C0', X'C8', X'F5', X'FD', X'C7', and X'CF', the type is type 1. When the value of the C field is other than the above, the type is type 2. According to this embodiment, when an upper layer protocol specifies the type of data link control by a connection request, data can be transmitted or received under the data link control hereafter.

Furthermore, a method for identifying an original Ethernet (registered trademark of Xerox Corp.) packet and an IEEE802.3 CSMA/CD packet which are controlled by an adapter will be explained with reference to FIG. 4.

In FIG. 4, the value of 2 bytes in the L field at the 12th byte from the top of the header, which is specified in the IEEE802.2 and IEEE802.3 standards, indicates a data length less than DSAP which ranges from 0 to 1500 bytes. In the original Ethernet packet, the value at the same location indicates the packet type expressed in a value of X'0600' or more. Therefore, when the value in the same field of the received packet is checked and found to be X'05DC' (1500 bytes) or less, it can be decided that the packet is a one which complies with the IEEE802.3 CSMA/CD protocol. When the value is X'0600" or more, it can be decided that the packet is an Ethernet packet. When the value is other than the above, it can be rejected because the protocol is different.

When an L3 sender/receiver is additionally installed in the driver 7 assuming the Ethernet (registered trademark of Xerox Corp.) packet as a third data link type in this case, the upper layer protocols can be correlated with the Ethernet packets by the method described in the above embodiment.

In this embodiment, the number of adapters 3 connected to the LAN is one. However, two or more adapters 3 may be connected to the same LAN so as to enhance the processing capacity or as a spare for a fault. Furthermore, when two or more different transmission media are used, an adapter can be mounted in correspondence to each transmission medium.

When a plurality of adapters are used as mentioned above, communication can be controlled by using the data link controller of the specified adapter by issuing the adapter number additionally as a connection request parameter by the upper layer protocol controller at the time of transmission and by identifying the packet type by the adapter at the time of reception.

Furthermore, when a plurality of adapters are used, the same number of data link controllers can be mounted. Also in this case, data can be communicated by deciding the data link controller of the adapter for issuing the transmission data from the communication protocol controller by the adapter number as a parameter and the identification number of the data link controller and by deciding the data link controller for issuing the received data by identifying the packet type by the adapter.

Next, the second embodiment of the present invention will be explained. A method for specifying the kind of upper layer protocol beforehand instead of specifying the data link type by the upper layer protocol controller will be explained with reference to FIGS. 5(b) and 2(d).

A pair of the kind of upper layer protocol and the data link type is set in the mapping table 23 of the common interface controller beforehand as shown in FIG. 5(b). The contents of the mapping table may be contained in the program or may be read from the secondary storage device at the starting time of the apparatus.

The upper layer protocol controller issues the connection request shown in FIG. 2(d) to the mapping processor 21 by specifying the kind of upper layer protocol P1 and the upper layer protocol controller entry address E1 as parameters. The mapping processor sets the entry address E1 in the column wherein the kind of upper layer protocol P1 is set with reference to the mapping table 23 and returns "normal return" to the connection request. Hereafter, data is transmitted or received in the same way as that shown in the previous embodiment.

According to this embodiment, when the correspondence between upper layer protocol controllers and data link controllers is determined, the processing of the application program by the upper layer protocol controllers can be minimized by storing the mapping table beforehand.

Furthermore, a third embodiment of the present invention will be explained with reference to the block diagram shown in FIG. 6. In the aforementioned examples, the method that an upper layer protocol controller is combined with a data link type by a connection request of the upper layer protocol controller. A method that the above combination is determined by a connection request packet from the communication partner processor will be described hereunder.

Figure 6:
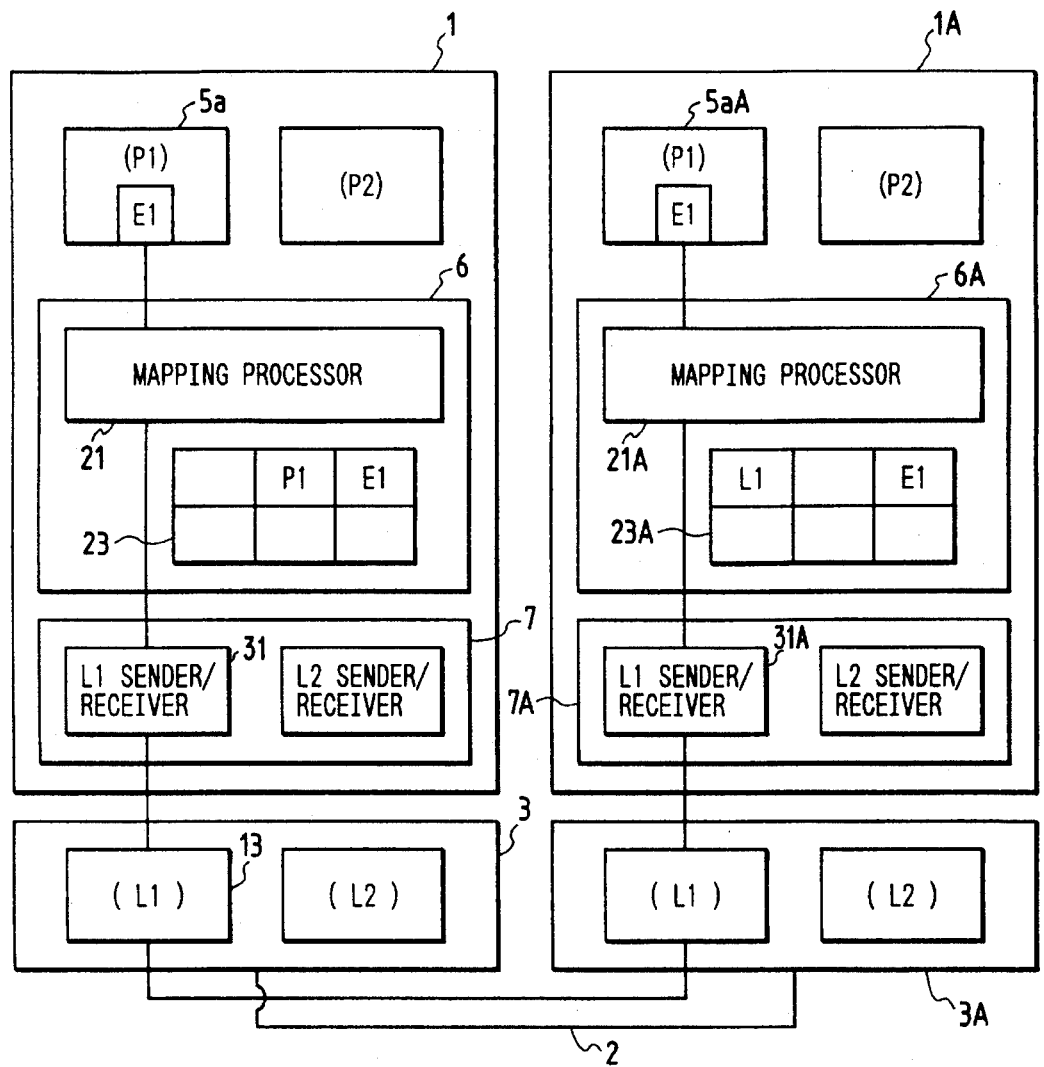
FIG. 6 is a block diagram for explaining the third embodiment of the present invention.

In FIG. 6, numeral 1A denotes a multi-protocol communication control apparatus which transmits a connection request packet and 1 a multi-protocol communication control apparatus which receives a connection request packet.

Firstly, the upper layer protocol controller 5a of the multi-protocol communication control apparatus 1 issues a connection request to the mapping processor 21 of the common interface controller 6 by specifying the kind of upper layer protocol P1 and the entry address E1 as parameters. In this case, no data link type is contained as a parameter. When the mapping processor 6 receives the connection request, it sets the kind of upper layer protocol P1 and the entry address E1 in the mapping table 23 and returns normally.

Furthermore, the upper layer protocol controller 5aA of the multi-protocol communication control apparatus 1A issues a connection request to the mapping processor 21A by specifying the data link type L1 and the entry address E1 as parameters. The mapping processor 21A sets the data link type L1 and the entry address E1 in the mapping table 23A and returns normally.

Figure 7:
FIG. 7 is a drawing showing the format of a connection request packet from an upper layer protocol controller.

Next, the upper layer protocol controller 5aA sends a connection request packet simultaneously with the Send request. The format of the connection request packet at this time is shown in FIG. 7. As shown in FIG. 7, the kind of upper layer protocol P1 and the kind of data link L1 are set in the connection request packet. The connection request packet is sent to the multi-protocol communication control apparatus 1 via the L1 sender/receiver 31A using the type 1 data link controller of the adapter 3A. In the multi-protocol communication control apparatus 1, the packet type identifier 11 of the adapter 3 identifies that the type of the connection request packet is type 1. The connection request packet is issued to the mapping processor 21 via the type 1 data link controller 13 and the L1 transmission and reception driver 31. The mapping processor 21 sets the data link type L1 corresponding to the kind of upper layer protocol P1 in the free column of the mapping table 23 from the connection request packet, and obtains the entry address E1 of the upper layer protocol controller from the mapping table 23, and issues the connection request packet simultaneously with the Recv request.

After the upper layer protocol controller 5a receives the connection request packet, the combination with the data link controller 13 is completed. By sending a Send request from one of the upper layer protocol controllers hereafter, data can be sent.

According to this embodiment, by sending a connection request packet from another communication control apparatus, the combinations of upper layer protocol controllers and data link types of both controllers can be set automatically to the same combination.

Next, a fourth embodiment of the present invention will be described with reference to FIG. 8.

Figure 8:
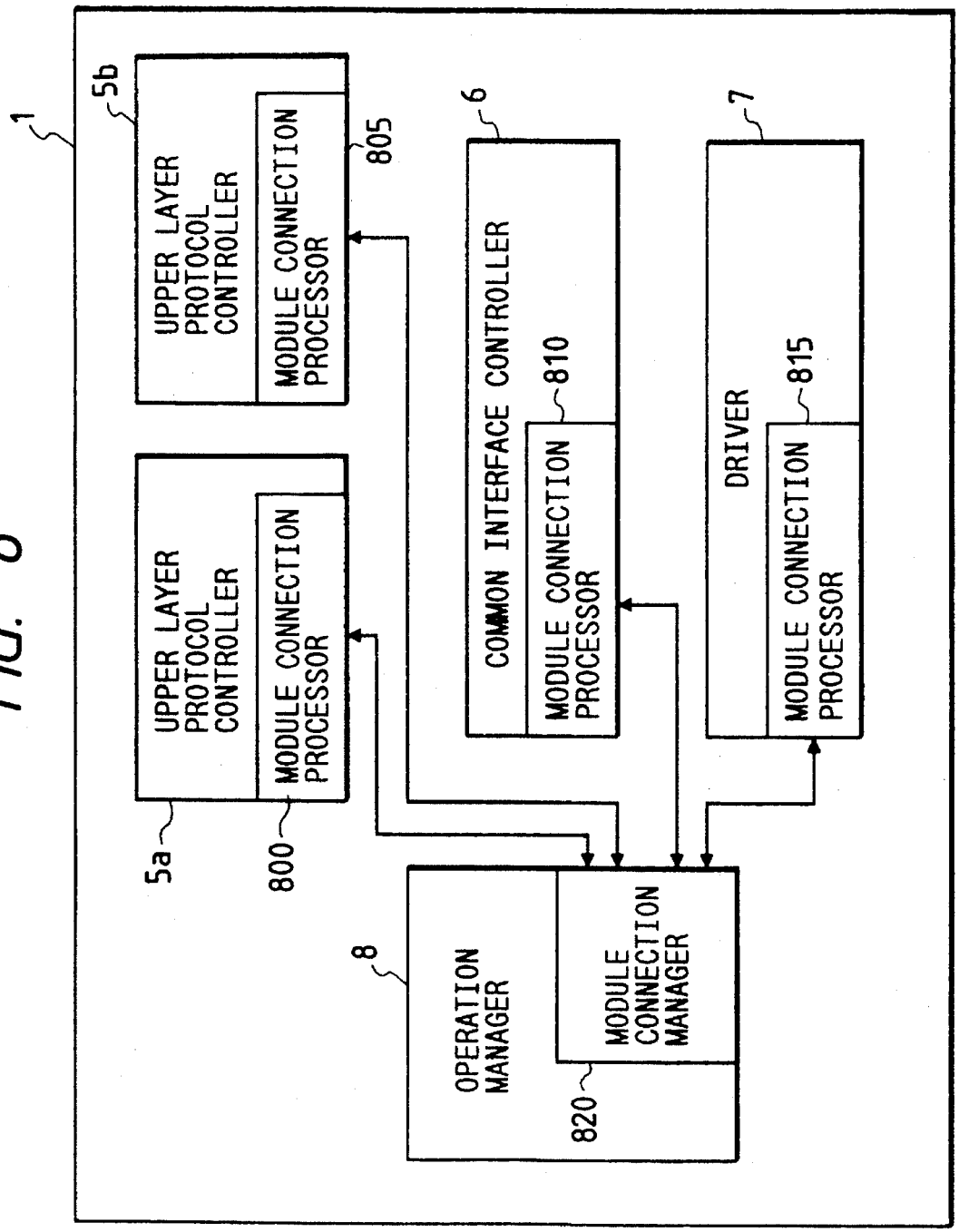
FIG. 8 is a block diagram showing the connection relationship between controllers for explaining the fourth embodiment of the present invention.

FIG. 8 is a block diagram showing the connection relationship between controllers. In FIG. 8, each of module connection processors 800, 805, 810, and 815 contains a module table for storing the control processing program of each controller (the upper layer protocol controllers 5a and 5b, common interface controller 6, and driver 7), a module management table for storing the top address of the above control processing program, and information on the module configuration of another controller for information exchange. By containing the information on the module configuration of the related controller and referring to the module configuration, each module connection processor can issue a start request. Each arrow indicates the flow of address information of the corresponding module. When each module connection processor is called from a module connection manager 820, it returns the top address of the module management table as return information. The module connection manager 820 stores the top address of each controller in the module link table.

Figure 9:
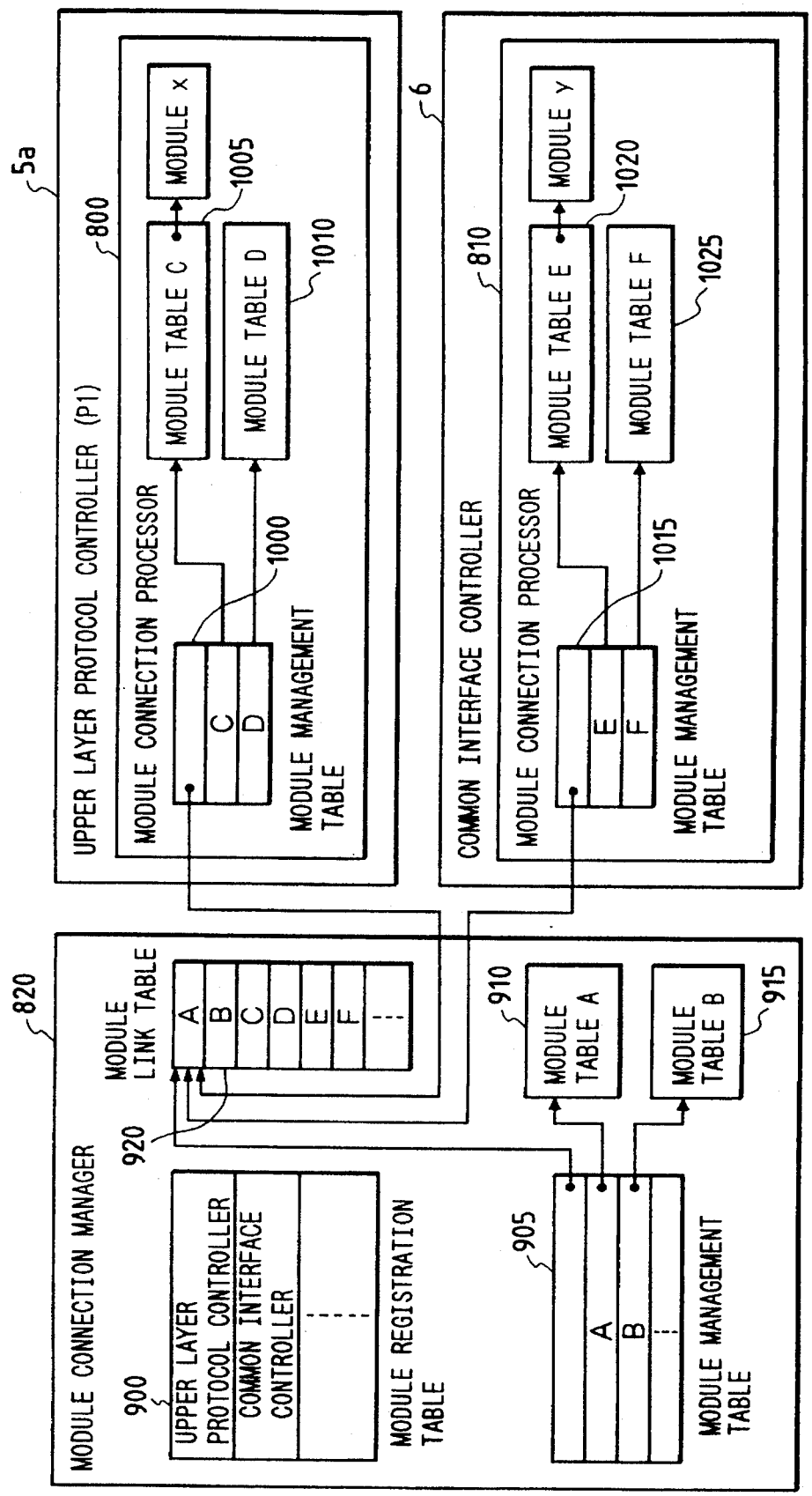
FIG. 9 is a drawing for explaining connection processing operations between controllers.

Next, the structure of each table will be explained with reference to FIG. 9. FIG. 9 is a drawing for explaining the connection operation between the controllers.

In a module registration table 900 of the module connection manager 820, a set of the identifier of each controller and the top address of the controller is registered. In each of module tables 910, 915, 1005, 1010, 1020, and 1025, the entry address of the control processing program for each module of each controller is registered when the program is created.

Furthermore, in a module management table 905 of the module connection manager 820, the top address of a module link table 920 and the top addresses of module tables A and B are registered. Furthermore, in module management tables 1000 and 1015 of other controllers, the top addresses 'C and D' and 'E and F' of the module tables of the controllers are registered when the program is created. Next, the operation of the module connection manager 820 will be explained.

Firstly, the module connection manager 820 obtains the top address of a module connection processor 800 of the upper layer protocol controller 5a from the module registration table 900. Next, the module connection manager 820 calls the module connection processor 800 using the top address of the module link table 920 as an argument. The module connection processor 800 registers the addresses of the module link table 920 in the module management table 1000 and returns the addresses of module tables C and D of the module management table 1000 as return information.

The module connection manager 820 fetches the addresses of the module tables C and D from the module management table 1000 which are obtained as return information and registers them in the module link table 920.

The module connection manager 820 also registers the addresses of the module link table 920 in the module management table 1015 of the common interface controller 6 and simultaneously registers module tables E and F of the common interface controller 6 in the module link table 920.

By doing this, the top addresses of the processing modules of the controllers which are registered in the module registration table 900 are all stored in a batch in the module link table 920 of the module connection manager 820. The addresses stored in the module link table 920 are registered in the module management tables of the controllers.

The module connection operation when one of the upper layer protocol controllers issues a start request will be explained using an example that a module x of the upper layer protocol controller 5a calls a module y registered in the module table E of the common interface controller 6.

In this example, the module x is a module for issuing a start request of the upper layer protocol controller 5a and the module y is an initialization processor 20 of the common interface controller 6.

The module connection processor 800 has the module configuration of the related module connection processor 810 of the common interface controller 6. When the module connection processor 800 issues a start request, it finds that the module y is registered in the module table E with reference to the above module configuration. The address of the module y is obtained as follows using E and y as arguments.

The module x finds the address of the module link table 920 from the module management table 1000 and obtains the address of the module table E of the module management table 1015 from the module link table 920. Next, the module x obtains the entry address of the module y from the module table E 1020 and calls it.

According to the present invention, as mentioned above, the module connection processors mounted in the upper layer protocol controller, the lower layer protocol controller, and the common interface controller register module connection information of the controllers in the module tables thereof and register the addresses thereof in the module management tables so as to manage the module entry address information of the controllers.

Furthermore, the module connection manager identifies the existence of each processor with reference to the module registration table, refers to the module management tables of the controllers, and registers the pointers to the module tables which are registered in the module management table in the module link table of the module connection manager so as to integrate and manage the module entry address information of the controllers. The module connection manager registers the pointers to the module link table in the module management tables of the controllers so that each of the processors recognizes module entry address information of other processors so as to connect with each other.

In the above embodiment, each module connection processor has information on the module configuration of another controller for information exchange. However, the module connection manager may have such information. In this case, the module connection manager receives a call from each controller, recognizes the module of the corresponding controller with reference to the module configuration, and obtains the address of the module of the corresponding controller by calling each controller.

According to the prior art, since the upper layer protocol controllers and the lower layer protocol controllers form a load module, it is impossible to develop an individual controller, resulting in a reduction in development efficiency. According to this embodiment, each controller can be developed as an independent loading unit so as to improve the development efficiency.

According to the prior art, furthermore, even when only a part of a plurality of upper layer protocol controllers is used, the other unnecessary upper layer protocol controllers are also loaded into the memory, causing a reduction in memory use efficiency. According to this embodiment, only necessary protocol controllers can be loaded for multi-protocol communication, so that the memory use efficiency improves.

Furthermore, the upper layer protocol controllers can be connected or separated freely, so that only necessary protocol controllers can be loaded in the memory. Therefore, an individual protocol controller can be developed and the development efficiency is improved. Furthermore, the protocol control software can be minimized in size and the memory use efficiency can be improved.

Next, the fifth embodiment of the present invention will be explained with reference to FIG. 10.

Figures 10, 11:
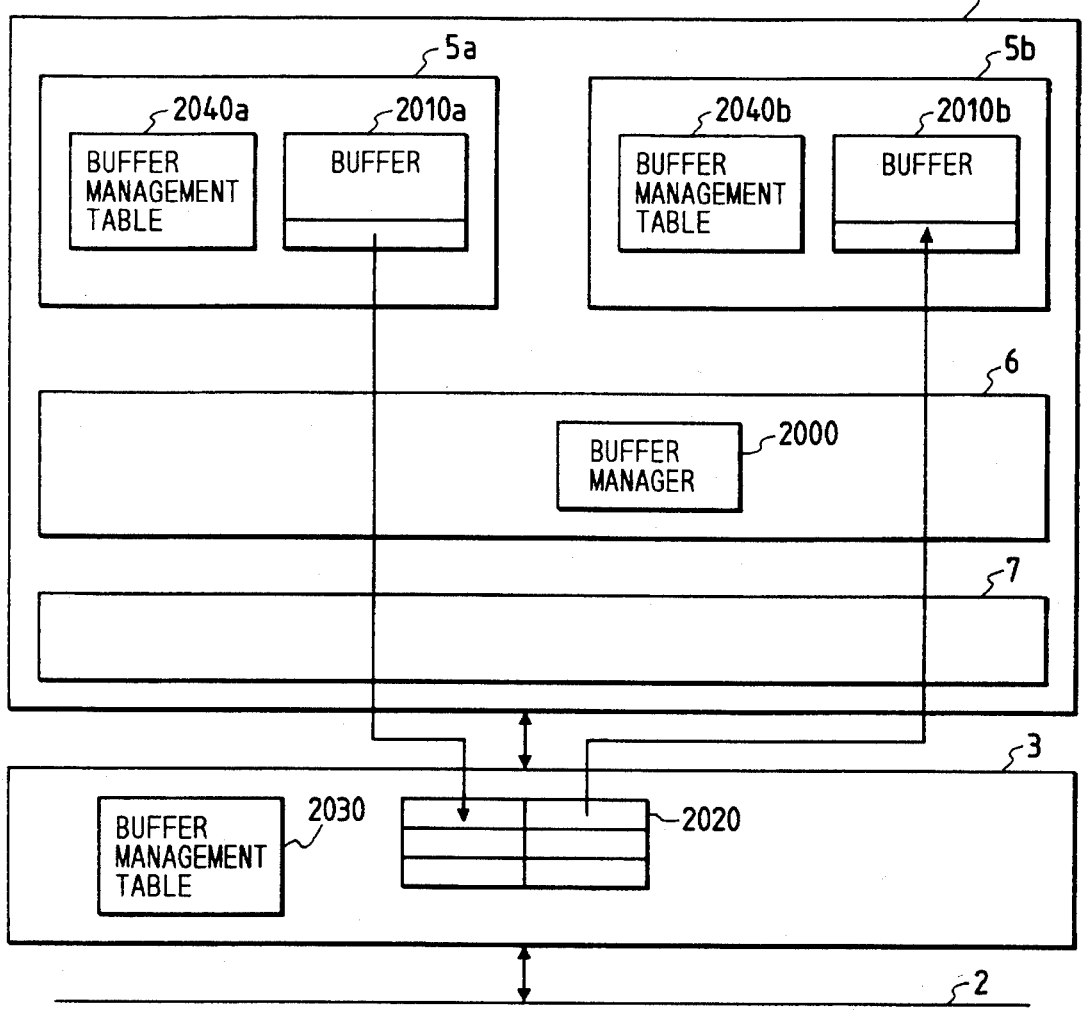
FIG. 10 is a drawing showing the fifth embodiment of the present invention for explaining data transfer for buffer management.
FIG. 11 is a drawing showing the structure of a buffer management table.

FIG. 10 shows the data movement status for buffer management. A buffer manager 2000 is mounted in the common interface controller 6 and the upper layer protocol controllers 5a and 5b have upper buffers 2010a and 2010b. The adapter 3 contains a data link buffer 2020. The upper buffers 2010a and 2010b and the data link buffer 2020 contain areas inside which serial numbers are assigned to. The buffer manager 2000 transfers (moves) data between the upper buffers 2010a and 2010b and the data link buffer 2020.

The buffer manager 2000 controls a data link buffer management table 2030 and upper buffer management tables 2040a and 2040b so as to manage the buffers.

The structure of the buffer management table 2030 is shown in FIG. 11. In FIG. 11, a buffer number 2031 contains the serial numbers assigned to the areas in the buffer 2020 and the top addresses thereof and a buffer busy flag 2032 indicates where each area of the buffer 2020 is in use. The structures of the upper buffer management tables 2040a and 2040b are the same as above.

Next, the operation of each buffer at the time of reception will be explained.

In this example, the data link type of the received packet is type 1 and the received data is issued to the upper layer protocol controller 5a by the mapping processor 21.

The adapter 3 receives the packet, sets it in an unbusy area of the data link buffer with reference to the data link buffer management table 2030, and turns the busy flag of the above buffer area number of the data link buffer management table ON.

Next, the adapter 3 issues a Recv request to the common interface controller 6 via the driver 7. The Recv request is required to contain the area address of the data link buffer as a parameter.

Next, the buffer manager 2000 of the common interface controller 6 searches for an unbusy area of the upper buffer with reference to the upper buffer management table 2040a, transfers the contents of the data link buffer to the unbusy area, turns the busy flag of the data link buffer management table 2030 OFF, turns the busy flag of the above upper buffer ON, sets the above upper buffer area number in the Recv request as a parameter, and issues the request to the upper layer protocol controller 5a.

The upper layer protocol controller 5a processes the received data in the buffer area of the parameter area number of the Recv request and turns the above upper buffer busy flag OFF when the processing ends.

Next, the transmission operation will be explained.

In this example, it is assumed that the upper layer protocol controller 5b sends data using data link type 2. The upper layer protocol controller 5b sets transmission data in a free area of the upper buffer 2010b, turns the busy flag of the above upper buffer area number ON, and issues a Send request to the common interface controller 6. The Send request contains the above upper buffer area number as a parameter.

The buffer manager 2000 of the common interface controller 6 searches for an unbusy area of the data link buffer 2020 with reference to the data link buffer management table 2030, transfers the contents of the above upper buffer 2010b to the unbusy area, and turns the busy flag of the above area number of the upper buffer 2010b OFF. The buffer manager 2000 turns the busy flag of the above area number of the data link buffer 2020 ON, sets the address of the data link buffer in the Send request, and issues the Send request to the adapter 3 via the driver 7.

The adapter 3 sends the data of the buffer to the transmission medium 2 according to the Send request and turns the busy flag of the above area number of the data link buffer 2020 OFF.

According to this embodiment like this, in the case of reception, the buffer of the data link controller issues data to the upper layer protocol controller and then enters the unbusy state. In the case of transmission, the buffer of the data link controller is kept in the unbusy state until the upper layer protocol controller transfers the transmission data to the data link controller.

Therefore, even if it requires a lot of time for one upper layer protocol controller to send or receive data, the buffer of the data link controller is not occupied, and the transmission or reception processing of another upper layer protocol controller is not affected, and services for a plurality of upper layer protocol controllers are equalized.

Next, the multi-protocol network system of the present invention will be explained.

Figure 12:
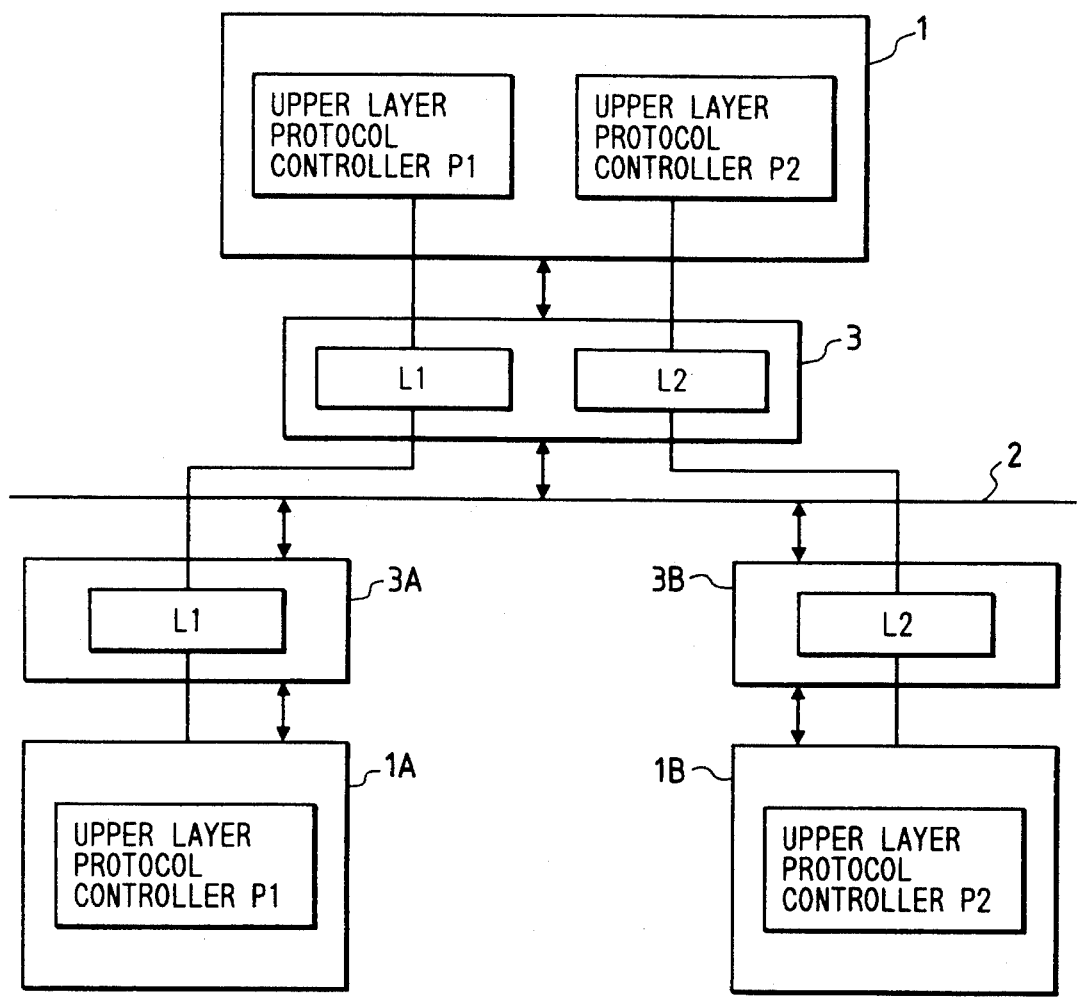
FIG. 12 is a drawing showing the entire structure of a communication system using a multi-protocol communication control apparatus according to the present invention.

FIG. 12 shows an entire configuration example of the multi-protocol network system of the present invention. In FIG. 12, numeral 1 denotes the main unit of a multi-protocol communication control apparatus which is exactly the same as the aforementioned apparatus. Numeral 3 denotes an adapter for data link control. Numeral 1A denotes a conventional individual communication control apparatus containing only an upper layer protocol controller P1. Numeral 3A denotes a type 1 data link controller L1 which is connected to 1A. Numeral 1B denotes a conventional individual communication control apparatus containing only an upper layer protocol controller P2. Numeral 3B denotes a type 2 data link controller L2 which is connected to 1B.

Next, the operation will be explained.

The upper layer protocol controller P1 of the multi-protocol communication control apparatus 1 communicates with the upper layer protocol controller P1 of the other communication control apparatus 1A using the type 1 data link controller L1.

Furthermore, the upper layer protocol controller P2 of the multi-protocol communication control apparatus 1 can communicate with the upper layer protocol controller P2 of the communication control apparatus 1B using the type 2 data link controller L2.

Unlike this embodiment, a plurality of multi-protocol communication control apparatuses or a plurality of conventional individual communication control apparatuses may be installed.

By doing this, a multi-protocol network system containing multi-protocol communication control apparatuses and conventional communication control apparatuses can be constructed.

A multi-protocol network system for realizing communication by an optional combination of a plurality of kinds of upper layer communication protocols, a plurality of kinds of lower layer communication protocols, and a plurality of transmission lines can be constructed.

Furthermore, a means for notifying one communication control apparatus of a combination of upper layer protocols and lower layer protocols of the other communication control apparatus is installed between the communication control apparatuses, so that it is guaranteed to use the same protocol and a communication disabled trouble due to different protocols can be prevented.

What is claimed is:

1. A multi-protocol communication control apparatus in a multi-protocol communication network system which couples a plurality of said multi-protocal communication control apparatuses through transmission mediums, comprising:

a plurality of lower layer protocal controllers, each of said lower layer protocol controllers having a lower layer protocol different from the lower layer protocols of the other lower layer protocal controllers and being capable of at least forming a data link and transmitting communication data through a predetermined transmission medium, each of said lower layer protocol controllers includes a data link controller and a sender/receiver for driving said data link controller to send and receive communication data having a communication data format of a data link type different from communication data of the other data link controllers;

a plurality of upper layer protocol controllers, each of said upper layer protocol controllers having an upper layer protocol different from upper layer protocols of the other upper layer protocol controllers and being capable of at least forming a transport layer and network layer defined by a predetermined application, each of said upper layer protocol controllers outputting a request which has a data link type and an entry address;

a common interface controller installed between said lower layer protocol controllers and said upper layer protocol controllers, said common interface controller includes a mapping table for storing information indicating corresponding relations between a kind of upper layer protocol controller and a kind of lower layer protocol controller in accordance with said request from each of said upper layer protocol controllers and a mapping processor for processing exchanges of communication data between each of said sender/receivers provided in each of the lower layer protocol controllers and each of the upper layer protocol controllers in accordance with said information indicating a corresponding relation stored on said mapping table; and a packet type identifier for identifying a kind of data link type in a packet of communication data received through a transmission medium from another multi-protocol communication control apparatus and for transmitting said packet of communication data to a desired data link controller selected in accordance with said identified kind of data link type.

2. A multi-protocal communication control apparatus according to claim 1, wherein each of the lower layer protocal controllers has identification means for identifying the kind of lower layer protocal for the received communication data.

3. A multi-protocal communication control apparatus according to claim 2, wherein the plurality of upper layer protocal controllers, the common interface controller, and the plurality of lower layer protocal controllers are modularly constructed respectively and each of the upper layer, common interface and lower layer controllers has a module connection processor for storing module connection information indicating the top address of a control processing program thereof and has a common module connection manager for receiving and storing the module connection information from the module connection processor of each controller for connecting the controllers to each other.

4. A multi-protocol communication control apparatus according to claim 1, wherein the common interface controller furthermore has means for specifying a kind of upper layer protocol for the common interface controller of another multi-protocol communication control apparatus.

5. A multi-protocol communication control apparatus according to claim 1, wherein the plurality of kinds of upper layer protocol controllers, the common interface controller, and the plurality of lower layer protocol controllers are modularly constructed respectively and each of the upper layer, common interface and lower layer controllers has a module connection processor for storing module connection information indicating the top address of a control processing program thereof and has a common module connection manager for receiving and storing the module connection information from the module connection processor of each controller for connecting the controllers to each other.

6. A multi-protocol communication control apparatus according to claim 1, wherein the upper layer protocol controllers and the lower layer protocol controllers have buffers for storing data respectively and the common interface controller has a buffer manager for transferring data between the buffers of the upper layer protocol controllers and the buffers of the lower layer protocol controllers.

7. A multi-protocol communication control apparatus according to claim 1, wherein each of the lower layer protocal controllers has identification means for identifying the kind of lower layer protocol for the received communication data.

* * * * *